United States Patent
Dighton et al.

(10) Patent No.: US 11,224,170 B2
(45) Date of Patent: Jan. 18, 2022

(54) ACTUATOR ADJUSTABLE FAN ENCLOSURE

(71) Applicant: DEERE & COMPANY, Moline, IL (US)

(72) Inventors: John A. Dighton, Thibodaux, LA (US); Matthew J. Hansen, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 417 days.

(21) Appl. No.: 16/214,757

(22) Filed: Dec. 10, 2018

(65) Prior Publication Data

US 2020/0178467 A1 Jun. 11, 2020

(51) Int. Cl.
| | |
|---|---|
| A01D 45/10 | (2006.01) |
| A01F 12/44 | (2006.01) |
| B07B 11/06 | (2006.01) |
| A01D 43/073 | (2006.01) |

(52) U.S. Cl.
CPC ............ *A01F 12/444* (2013.01); *A01D 45/10* (2013.01); *B07B 11/06* (2013.01); *A01D 43/073* (2013.01)

(58) Field of Classification Search
CPC ..... B07B 11/06; A01D 43/073; A01D 43/087; A01D 43/077; A01D 45/10; A01D 57/10; A01D 87/10; A01F 12/444; A01F 12/48; A01F 12/54; A47L 5/14

See application file for complete search history.

(56) References Cited

U.S. PATENT DOCUMENTS

| | | | | |
|---|---|---|---|---|
| 597,364 | A * | 1/1898 | Randolph | A01D 45/10 406/104 |
| 613,260 | A * | 11/1898 | Felsing et al. | A01D 43/077 406/139 |
| 3,325,982 | A | 6/1967 | Fogels et al. | |
| 4,924,662 | A * | 5/1990 | Quick | A01D 45/10 56/12.8 |
| 5,953,891 | A | 9/1999 | Leigers et al. | |
| 6,076,340 | A * | 6/2000 | Fowler | A01D 45/10 56/13.9 |
| 6,363,700 | B1 * | 4/2002 | Fowler | A01D 45/10 56/13.9 |
| 2005/0196305 | A1 * | 9/2005 | Van Vooren | A01D 43/086 417/423.14 |
| 2010/0202864 | A1 * | 8/2010 | Geraets | B65G 33/10 414/526 |
| 2016/0270294 | A1 * | 9/2016 | Viaene | A01D 43/073 |
| 2016/0353951 | A1 * | 12/2016 | Buchanan | F04D 29/4213 |
| 2017/0112071 | A1 * | 4/2017 | Shumaker | E01H 1/0809 |
| 2018/0116114 | A1 * | 5/2018 | Craig | A01D 45/10 |

FOREIGN PATENT DOCUMENTS

| | | | | |
|---|---|---|---|---|
| WO | 8500268 | A1 | 1/1985 | |
| WO | WO-2018037543 | A1 * | 3/2018 | A01D 45/10 |

* cited by examiner

*Primary Examiner* — Adam J Behrens
(74) *Attorney, Agent, or Firm* — Taft Stettinius & Hollister LLP; Stephen F. Rost

(57) ABSTRACT

A hood assembly for a fan that has a base section, a discharge nozzle pivotally coupled to the base section, and a motor coupled between the base section and the discharge nozzle. Wherein, the discharge nozzle is repositionable with the motor to alter the orientation of the discharge nozzle relative to the base section.

11 Claims, 3 Drawing Sheets

ACTUATOR ADJUSTABLE FAN ENCLOSURE

FIELD OF THE DISCLOSURE

The present disclosure relates to a fan enclosure and more specifically to a fan enclosure that has an adjustable discharge nozzle.

BACKGROUND

Sugarcane harvesters are used to harvest sugarcane and separate the stock of the sugarcane plant from other leafy debris. Many sugarcane harvesters have row dividers with scroll assemblies positioned thereon to orient the sugarcane crop in a substantially upright position prior to being cut along a base portion of the sugarcane plant. Once the plant is cut, the sugarcane harvester feeds the plant through a chopper assembly wherein the sugarcane plant is chopped into smaller pieces commonly referred to as billets.

Many sugarcane harvesters separate the sugarcane stock from the leaves and other debris utilizing one or more extractor. The extractor utilizes a fan or the like to separate the debris from the billets by passing the debris and billets through an air stream created by the fan. The air stream takes the lighter debris, such as sugarcane leaves or the like, and moves the lighter debris through a hood of the extractor and out of the hood in a discharge direction. The heavier billets are left to be further processed by the sugarcane harvester.

In a typical sugarcane harvester, a discharge angle of the extractor is predetermined based on the geometry of the hood. Frequently, the discharge angle is biased towards an underlying surface to quickly move the debris from the extractor to the underlying surface. A sugarcane harvester is often utilized to harvest the sugarcane by making S-like passes through the sugarcane field. In this use, the sugarcane harvester often has one side that is oriented towards a cut section of the field and another side that is oriented towards crop that has not yet been harvested. Accordingly a typical sugarcane harvester implements a hood that establishes a discharge path for the debris that is angled down towards the underlying surface to limit the amount of debris that is blown or otherwise deposited among the crop that has not yet been harvested. Any debris that becomes positioned with the crop that has not yet been harvested may have to be reprocessed by the sugarcane harvester in a subsequent pass.

In one aspect of the typical sugarcane harvester, the fan of the extractor generates an air flow that is substantially away from the underlying surface at a hood inlet. In this orientation, the hood of the extractor often redirects the air flow greater than ninety degrees in order to generate a discharge angle that is biased towards the ground to thereby reduce the likelihood that debris becomes positioned with uncut crop. Altering the discharge angle to this extent creates resistance to the air flow of the fan. This added resistance must be overcome by utilizing a fan assembly and motor that have sufficient power to overcome the resistance created by the hood. Similarly, the power requirements of the extractor must be considered when determining the type of prime mover, hydraulic system, pneumatic system, and electrical system to implement on the sugarcane harvester.

The discharge angle established by the typical hood may only be necessary in certain external situations. In one non-exclusive example, the discharge angle of the typical extractor hood may only be necessary when there is a strong cross wind blowing the debris towards the uncut crop. Accordingly, a typical sugarcane harvester restricts air flow through the extractor with the hood unnecessarily at least during certain harvesting conditions. Accordingly, there is a need for a hood that is adjustable to allow the fan assembly of the extractor to operate as efficiently as possible based on the external environment and a user preference.

SUMMARY

One embodiment is a hood assembly for a fan that has a base section, a discharge nozzle pivotally coupled to the base section, and a motor coupled between the base section and the discharge nozzle. Wherein, the discharge nozzle is repositionable with the motor to alter the orientation of the discharge nozzle relative to the base section.

In one example of this embodiment, the motor is a linear actuator.

In another example, the motor is a hydraulic actuator.

In yet another example, the motor is a rotary actuator.

In another example, the fan rotates about a fan axis and the discharge nozzle pivots about a nozzle axis, wherein the nozzle axis is approximately ninety degrees offset relative to the fan axis.

In another example of this embodiment, repositioning the discharge nozzle alters a discharge angle of the hood assembly relative to an underlying surface.

One example of this embodiment has a user input, wherein the user input selectably alters the orientation of the discharge nozzle relative to the base.

In yet another example of this embodiment, the discharge nozzle has a first position and a second position, wherein the first position provides increased resistance to air flow from the fan relative to the second position.

In yet another example, the discharge nozzle at least partially overlaps an outer surface of the base.

Another embodiment is a hood assembly for an extractor of a harvesting machine having a fan assembly configured to provide an air flow, a base section coupled to the fan assembly to direct the air flow, a discharge nozzle pivotally coupled to the base section and configured to move between a first position and as second position, and a motor coupled between the base section and the discharge nozzle to selectively reposition the discharge nozzle between the first position and the second position.

One example of this embodiment has a user interface that selectively engages the motor to transition the discharge nozzle to any position between the first position and the second position. In one aspect of this example the user interface is positioned inside a cab of the harvesting machine.

In another example of this embodiment in the second position the discharge nozzle directs a discharge flow in a substantially horizontal direction.

In yet another example in the first position the discharge nozzle directs a discharge flow in a direction biased towards an underlying surface.

In another example, the discharge nozzle has an arcuate cross section and is pivotally coupled to the base about a nozzle axis.

In one example, as the discharge nozzle transitions from the first position to the second position, resistance to the air flow through the hood assembly is reduced.

Another embodiment is a sugarcane harvesting assembly that has a chassis having at least one ground engaging mechanism, a cab coupled to the chassis, a harvesting assembly configured to direct and cut crop, a cleaning assembly having at least one extractor, and a prime mover providing power to the ground engaging mechanism, the harvesting assembly, and the cleaning assembly. Wherein, the least one extractor has a fan assembly configured to provide an air flow, a base section positioned about the fan assembly to direct the air flow, a discharge nozzle pivotally coupled to the base section and configured to move between a first position and a second position, and a motor coupled between the base section and the discharge nozzle to selectively reposition the discharge nozzle between the first position and the second position.

One example of this embodiment has a user interface that communicates with the motor to reposition the discharge nozzle, wherein the discharge nozzle is repositionable by a user with the user interface to any position between the first position and the second position.

In another example, the position of the discharge nozzle affects a discharge angle of the cleaning assembly, wherein the first position has a first discharge angle and the second position has a second discharge angle, the first discharge angle being more biased towards an underlying surface than the second discharge angle. In one aspect of this example the second discharge angle generates a lower fan resistance than the first discharge angle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
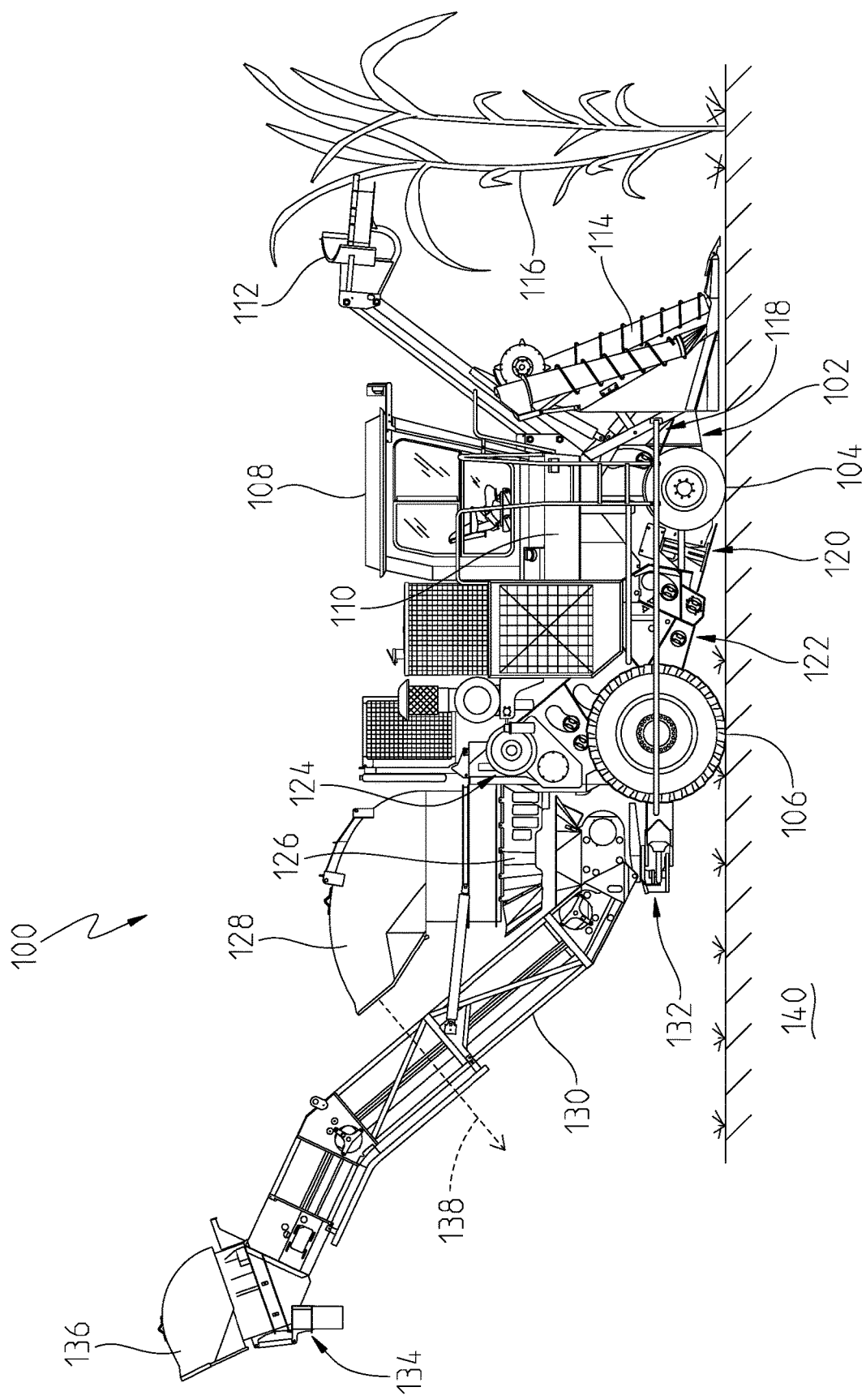
FIG. 1 is a side view of a work machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Turning now to FIG. 1 of this disclosure, an embodiment of a sugarcane harvesting machine 100 is shown. The harvester or machine 100 is presented in a side view in FIG. 1, with the front of the machine 100 facing to the right. Accordingly, certain left-side components of the machine 100 may not be visible in FIG. 1.

The machine 100 may include a main frame 102 supported on track assemblies (not shown) or wheels (i.e., a front wheel 104 and a rear wheel 106), with a cab 108 adapted to house an operator. The cab 108 may include a plurality of controls for controlling the operation of the machine 100. An engine 110 or other power system may supply power for driving the machine 100 along a field and for powering various driven components of the machine. In certain embodiments, the engine 110 may directly power a hydraulic pump (not shown), and various driven components of the harvester may be powered by hydraulic motors (not shown) receiving hydraulic power from the hydraulic pump via an embedded hydraulic system (not shown).

A cane topper 112 may extend forward of the frame 102 in order to remove the leafy tops of sugarcane plants 116, and a set of crop dividers 114 (only the right-side divider shown in FIG. 1) may then guide the remainder of the sugarcane toward internal mechanisms of the machine 100 for processing. As the sugarcane harvesting machine 100 moves across a field, plants 116 passing between the crop dividers 114 may be deflected downward by one or more knockdown rollers 118 before being cut near the base of the plants by a base cutter assembly 120 mounted on the main frame 102. Rotating disks, guides, or paddles (not shown) on the base cutter assembly 120 may further direct the cut ends of the plants upwardly and rearward within the harvester 100 toward a feeding mechanism such as successive pairs of upper and lower feed rollers (not shown). The feeding mechanism may be rotatably supported by a chassis 122, and may be rotatably driven by a hydraulic motor or other device (not shown) in order to convey the stalks toward a chopper drum module 124 for chopping into relatively uniform billets.

The chopper drum module 124 may include upper and lower chopper drums which may rotate in opposite directions around, respectively, parallel axes (not shown) in order to chop the passing stalks into billets and propel the billets into a cleaning chamber 126 at the base of a first or primary extractor 128. The first extractor 128 may utilize a powered fan to extract trash and debris from the cleaning chamber 126.

As also shown in FIG. 1, a loading conveyor or elevator system 130 may be provided at a rear portion of the harvester. The loading conveyor or elevator system 130 may include a forward end located at the bottom of the cleaning chamber 126, and the system may then convey the cleaned billets upward to a discharge location 134 near or below a second extractor 136. The billets may be discharged via the second extractor 136 into a trailing truck, cart, wagon or other receptacle (not shown).

The elevator or conveyor system 130 may be coupled to a swing table or pivot bearing 132, as shown in FIG. 1. As such, the entire system 130 is capable of pivoting up to or about 180° to unload the billets from either side of the machine 100.

In one aspect of this disclosure, the first extractor 128 may be located adjacent a basket as part of the cleaning chamber 126. During operation, the sugarcane billets may pass through the basket and be received at a first end of a conveyor. The first extractor 128 may include a suction blower, powered fan, or other similar apparatus for drawing debris (i.e., leaves) and other impurities from the sugarcane billets that are received by the inclined conveyor. Further, the first extractor 128 may have a hood with a defined discharge nozzle formed therein. The discharge nozzle of the hood may direct debris out of the first extractor 128 along a discharge path 138 that is angled towards the underlying surface 140. The discharge path 138 may be angled downwardly towards the underlying surface 140 to direct debris extracted therefrom towards the underlying surface 140 as quickly as possible to avoid allowing the debris to be deposited on adjacent rows of crop that have yet to be harvested. In other words, the first extractor 128 often has a preset discharge path 138 to limit the possibility of a cross wind or the like blowing debris that exits the first extractor 128 onto unharvested crop.

Figure 2:
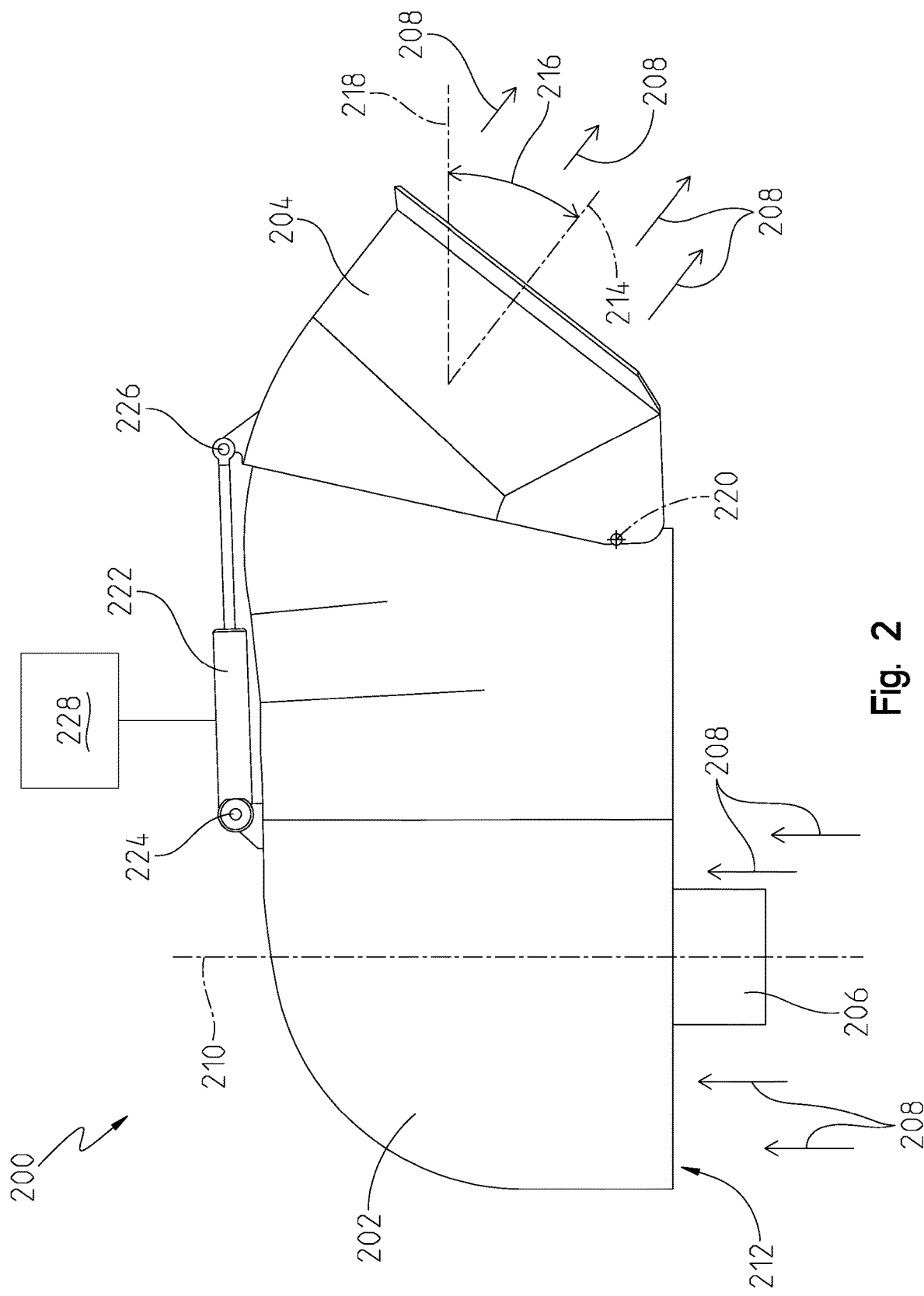
FIG. 2 is a side view of a hood assembly.

Referring now to FIG. 2, one embodiment of the present disclosure is illustrated. More specifically, FIG. 2 illustrates a hood assembly 200 having a base section 202 with a discharge nozzle 204 pivotally coupled thereto. The base section 202 may have a fan assembly 206 or the like positioned to direct an air flow 208 through the hood assembly 200. The fan assembly 206 may have a fan or the like that rotates about a fan axis 210 to generate the air flow 208. In one non-exclusive example, the fan axis 210 is substantially perpendicular to the underlying surface when the work machine 100 is on level ground. However, other orientations of the fan axis 210 are also considered herein where the fan axis 210 is not perpendicular to the level ground.

In one aspect of this disclosure, the air flow 208 may initially be directed partially along the fan axis 210 at a base intake 212. At the base intake 212, the airflow 208 may be directed away from the underlying surface and into the hood assembly 200. Once in the hood assembly 200, the air flow 208 may be redirected by the base section 202 and the discharge nozzle 204 to exit the discharge nozzle 204 along a discharge path 214. While the discharge path 214 is illustrated as a substantially straight path, a person skilled in the relevant art understands the complexities in determining a precise fluid flow path and the air flow 208 around the discharge path 214 may not be exactly linear along the discharge path 214. In other words, the discharge path 214 may represent the most likely or average path of travel for the air flow 208 at the discharge nozzle 204.

In one aspect of this disclosure, a discharge angle 216 may represent the orientation of the discharge path 214 relative to a horizontal plane 218. The horizontal plane 218 may be a plane that is parallel to the level underlying surface. In this configuration, the discharge angle 216 may be angularly offset relative to the horizontal plane 218. In one non-exclusive example illustrated in FIG. 2, the discharge nozzle 204 may be in a first position wherein the discharge angle 216 is biased towards the underlying surface to direct any debris in the air flow 208 along the discharge path 214 to the underlying surface. In one non-exclusive example, the discharge angle 216 may be any angle greater than zero. Further still, in one non-exclusive embodiment the discharge angle 216 may be between about twenty and seventy degrees.

The discharge nozzle 204 may be pivotally coupled to the base section 202 about a nozzle axis 220 to allow for varying the discharge angle 216 of the discharge path 214. More specifically, a motor 222 may be positioned between the base section 202 and the discharge nozzle 204 to alter the position of the discharge nozzle 204 relative to the base section 202 about the nozzle axis 220. Consequently, as the motor 222 repositions the discharge nozzle 204 relative to the base section 202, the discharge path 214 and discharge angle 216 are altered as well.

The motor 222 may be any motor known in the art and capable of repositioning a member about an axis. In one non-exclusive example, the motor 222 is a linear actuator that is electrically, hydraulically, pneumatically, or the like powered. The linear actuator may have a base end 224 coupled to the base section 202 and a rod end 226 coupled to the discharge nozzle 204. In this configuration, the linear actuator motor 222 may alter the distance between the base end 224 and the rod end 226 as is known in the art. As the length of the linear actuator motor 222 changes, the discharge nozzle 204 pivots about the nozzle axis 220 to address the changes of the linear actuator motor 222. Accordingly, the length of the linear actuator motor 222 may dictate the discharge angle 216 of the discharge path 214.

In another embodiment of this disclosure, the motor 222 may be a rotary motor. The rotary motor may be electrically, hydraulically, pneumatically, or the like powered to rotate a motor output. In this embodiment, the motor output of the rotary motor may be coupled to a shaft that is fixedly coupled to the discharge nozzle 204 along the nozzle axis 220. The rotary motor may rotate to thereby rotate the discharge nozzle 204 about the nozzle axis 220. The rotary motor may also be coupled to a gear assembly to facilitate movement of the discharge nozzle 204 about the nozzle axis 220. In one embodiment, the rotary motor may be coupled to the base section 202 and have a pinion gear coupled to the motor output. A rack gear may be coupled to the discharge nozzle 204 and be meshed with the pinion gear of the rotary motor. In this configuration, as the rotary motor rotates the pinion gear, the rack gear and in turn the discharge nozzle 204 are moved therewith to reposition the discharge nozzle 204 about the nozzle axis 220.

While particular coupling locations for the motor 222 are discussed herein, any coupling location of the motor 222 is considered. More specifically, in the embodiment with the linear actuator motor 222, the base end 224 may be coupled to the discharge nozzle 204 and the rod end 226 may be coupled to the base section 202. Similarly, in the rotary motor embodiment the motor 222 may be coupled to the discharge nozzle 204 and interact with a shaft, rack gear, or gear assembly that is coupled to the base section 202. Accordingly, while specific coupling locations are discussed herein, this disclosure considers coupling the motor 222 to any portion of the hood assembly 200 that allows the discharge nozzle 204 to be repositioned with the motor 222 relative to the base section 202.

The motor 222 may ultimately be controlled by a user interface 228. The user interface 228 may be located in the cab 108 of the work machine 100 or the user interface 228 may be located along any other portion of the work machine 100. Further, in one example of this disclosure, the user interface 228 may be located remotely from the work machine 100. More specifically, the user interface 228 may be on a portable device that wirelessly communicates with the motor 222 to alter the discharge angle 216 of the discharge path 214 as instructed by the user. The user interface 228 may communicate with an electro-hydraulic system, an electro-pneumatic system, an electric system or the like to reposition the motor 222. The user interface 228 can be configured to instruct the motor 222 to pivot the discharge nozzle 204 about the nozzle axis 220 utilizing whatever system powers the motor 222.

Figure 3:
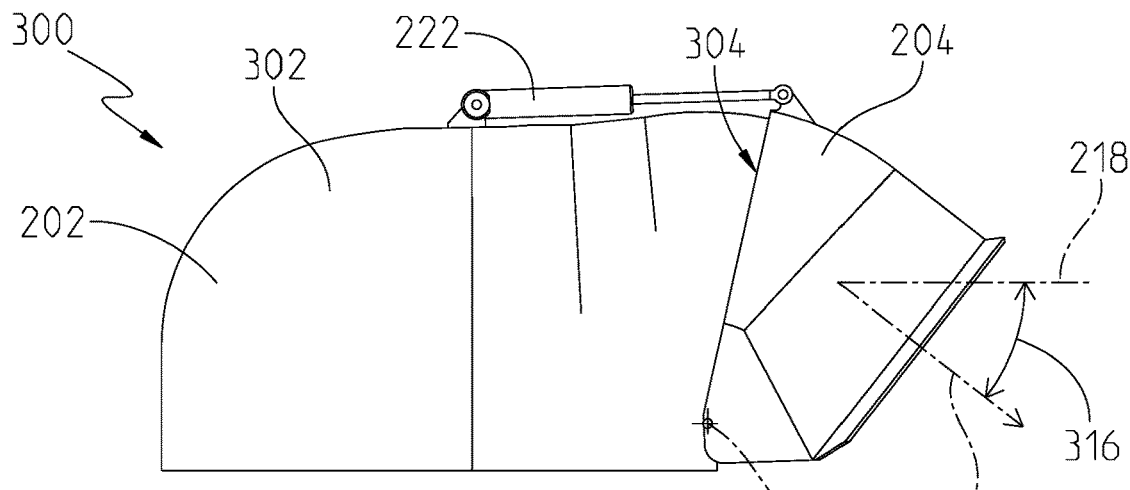
FIG. 3 is a side view of the hood assembly of FIG. 2 in a first position.
Figure 4:
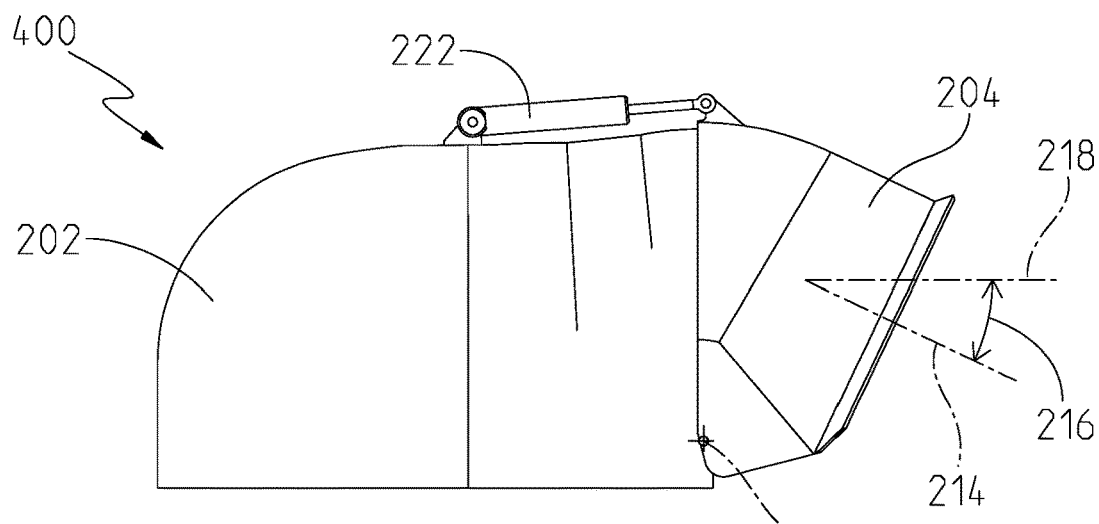
FIG. 4 is a side view of the hood assembly of FIG. 2 in an intermediate position.
Figure 5:
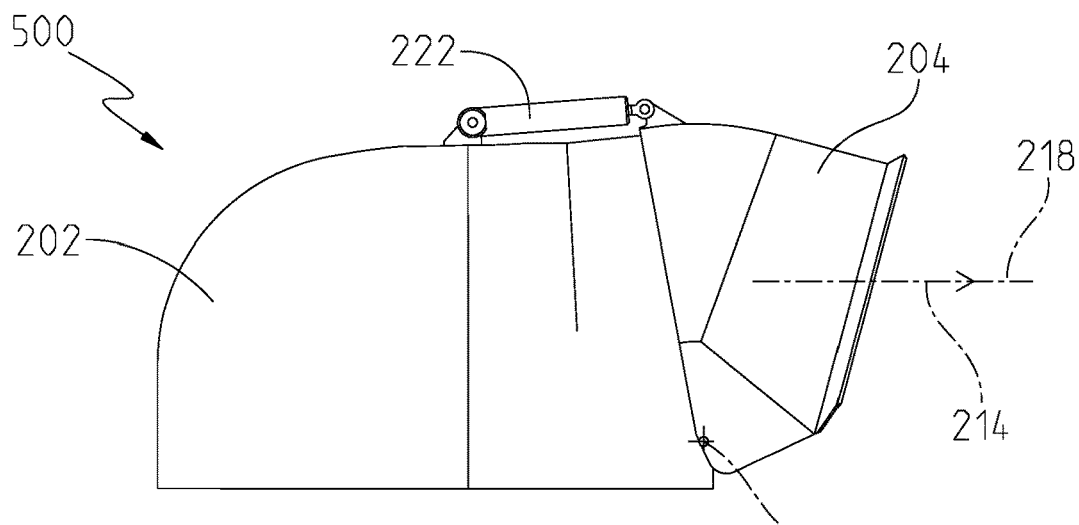
FIG. 5 is a side view of the hood assembly of FIG. 2 in a second position.

Referring now to FIGS. 3-5 the discharge nozzle 204 is illustrated transitioning from a first position 300 of FIG. 3, through an intermediate position 400 of FIG. 4, to a second position 500 of FIG. 5. In the first position 300, the motor 222 may orient the discharge nozzle 204 to a maximum discharge angle 316. The maximum discharge angle 316 may be the angle of the discharge path 214 relative to the horizontal plane 218 when the motor 222 will not pivot the discharge nozzle 204 any further away from the base section 202 about the nozzle axis 220. In other words, the maximum discharge angle 316 is the greatest discharge angle allowable by hood assembly 200 that biases the discharge path towards the underlying surface.

When the hood assembly 200 is in the first position 300, at least a portion of the discharge nozzle 204 may overlap at least a portion of the base section 202. More specifically, the discharge nozzle 204 may be positioned to have an overlap section 304 that is adjacent to an outer surface 302 of the base section 202. The overlap section 304 may promote a substantially unobstructed air flow 208 along the interior walls of the hood assembly 200 as the air transitions from the base section 202 to the discharge nozzle 204.

In one example of this disclosure, both the base section 202 and the discharge nozzle 204 may have a substantially arcuate cross section. More specifically, the arcuate cross section of the base section 202 may have a radius that is slightly smaller than the arcuate cross section of the discharge nozzle 204 at the overlap section 304. The arcuate cross section of the discharge nozzle 204 may allow the nozzle axis 220 to be positioned through two different locations of the discharge nozzle 204. In this configuration, the discharge nozzle 204 is substantially constrained from movement relative to the base section 202 except for pivoting about the nozzle axis 220. Accordingly, the motor 222 may be coupled between the base section 202 and the discharge nozzle 204 in any location that allows the motor 222 to apply a force directing the discharge nozzle 204 to pivot about the nozzle axis 220.

In addition to promoting substantially unobstructed air flow, the overlap portion 304 may also execute a cleaning or scraping function of the hood assembly 200. In one non-exclusive example, as the discharge nozzle 204 transitions from the first position 300 to the second position 500, the area of the overlap portion 304 increases. The similar arcuate cross sections of the base section 202 and the discharge nozzle 204 along the overlap section 304 allow the inner surface of the discharge nozzle 204 to pass closely over the outer surface 302 of the base section 202 along the overlap portion 304 as the hood assembly 200 transitions from the first position 300 to the second position 500. Accordingly, any debris that is positioned along the interior of the discharge nozzle 204 at the overlap portion 304 may be dislodged as the hood assembly 200 moves from the first position 300 to the second position 500.

In one aspect of this disclosure, the resistance to airflow 208 generated by the fan assembly 206 may be reduced as the hood assembly 200 transitions from the first position 300 to the second position 500. More specifically, when the hood assembly 200 is in the first position 300, the discharge angle 316 may be the greatest discharge angle for the hood assembly 200. In this orientation, the fan assembly 206 initially directs the air flow 208 away from the underlying surface substantially along a fan axis 210 at the base intake 212. Once the air and debris enter the base section 202, the airflow 208 is directed towards the discharge nozzle 204. Then, the discharge nozzle 204 directs the airflow out of the discharge nozzle 204 substantially along the discharge path 214. Accordingly, the greater the discharge angle 216, the greater the redirection of airflow 208 and the greater the resistance of airflow through the hood assembly 200.

In one aspect of this disclosure, the user may utilize the user input 228 to reposition the discharge nozzle 204 in any position at or between the first position 300 and the second position 500. More specifically, the user input 228 may have a first input option that instructs the motor 222 to move the discharge nozzle 204 towards the first position 300 and the user input 228 may have a second input option that instructs the motor 222 to move the discharge nozzle 204 towards the second position 500. Further still, the user may stop providing an input to the user input 228 when the discharge nozzle 204 is in any orientation between the first and second positions 300, 500. Accordingly, the user can position the discharge nozzle 204 at any discharge angle at or between the discharge angle of the first position 300 and the discharge angle at the second position 500 through the user interface 228.

The user input 228 allows the user to alter the discharge angle 216 to whatever discharge angle 216 is ideal for the conditions. For example, if a cross wind is directing debris in the discharge path 214 away from the unharvested crop, the user may position the discharge nozzle 204 in the second position 500 to reduce the resistance to air flow 208 generated by the discharge nozzle 204. In these conditions, the discharge path 214 may be less biased towards the underlying surface compared to the first position 300 because the cross wind will likely force the debris away from the unharvested crop.

However, the user may utilize the user input 228 to position the discharge nozzle 204 in the first position 300 when a cross wind is blowing debris from the discharge path 214 towards unharvested crop. In this condition, the user may want the discharge angle 216 to be as large as possible to ensure that debris is quickly directed to the underlying ground. In other words, when a cross wind or the like is forcing debris from the discharge nozzle 204 towards unharvested crop, the user may prefer a discharge angle 216 that quickly directs debris towards the underlying surface and thereby limits the likelihood that the debris is blown into unharvested crop.

This disclosure allows a user to select an ideal discharge angle 216 based on field conditions throughout the harvesting process among other things. During ideal conditions, the user may orient the discharge nozzle 204 in the second position 500 to reduce resistance to air flow 208 and thereby increase efficiency of the work machine 100 overall. However, during non-ideal conditions the user can increase the discharge angle 216 to reduce the amount of debris that becomes positioned on or in unharvested crop. Reducing debris that becomes positioned in or on unharvested crop helps the user avoid unnecessarily adding debris to the harvesting process.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A hood assembly for an extractor of a harvesting machine, comprising:
   a cutter and conveyor assembly to cut and convey crop to the extractor;
   a fan assembly configured to provide an airflow through the extractor;
   a base section coupled to the fan assembly to direct the air flow;
   a discharge nozzle pivotally coupled to the base section and configured to move between a first position and a second position;
   a motor coupled between the base section and the discharge nozzle to selectively reposition the discharge nozzle between the first position and the second position;
   wherein movement of the discharge nozzle relative to the base section between the first position and the second position alters a discharge angle of the discharge nozzle relative to a horizontal plane where the discharge angle is measured from the horizontal plane.

2. The hood assembly of claim 1, further comprising a user interface that selectively engages the motor to transition the discharge nozzle to any position between the first position and the second position.

3. The hood assembly of claim 2, further wherein the user interface is positioned inside a cab of the harvesting machine.

4. The hood assembly of claim 1, further wherein in the second position the discharge nozzle directs a discharge flow in a substantially horizontal direction parallel to the horizontal plane.

5. The hood assembly of claim 1, further wherein in the first position the discharge nozzle directs a discharge flow in a downward direction biased towards an underlying surface.

6. The hood assembly of claim 1, further wherein the discharge nozzle has an arcuate cross section and is pivotally coupled to the base about a nozzle axis.

7. The hood assembly of claim 1, further wherein as the discharge nozzle transitions from the first position to the second position, where the discharge angle of the second position is less than the discharge angle of the first position, resistance to the air flow through the hood assembly is reduced.

8. A sugarcane harvesting assembly, comprising:
   a chassis having at least one ground engaging mechanism;
   a cab coupled to the chassis;
   a harvesting assembly configured to direct and cut crop;
   a cleaning assembly having at least one extractor; and
   a prime mover providing power to the ground engaging mechanism, the harvesting assembly, and the cleaning assembly;
   wherein, the least one extractor comprises:
      a fan assembly configured to provide an air flow;
      a base section positioned about the fan assembly to direct the air flow;
      a discharge nozzle pivotally coupled to the base section and configured to move between a first position and a second position; and
      a motor coupled between the base section and the discharge nozzle to selectively reposition the discharge nozzle between the first position and the second position;
      wherein movement of the discharge nozzle relative to the base section between the first position and the second position affects a discharge angle of the cleaning assembly relative to a horizontal plane where the discharge angle is measured from the horizontal plane.

9. The sugarcane harvesting assembly of claim 8, further comprising a user interface that communicates with the motor to reposition the discharge nozzle, wherein the discharge nozzle is repositionable by a user with the user interface to any position between the first position and the second position.

10. The sugarcane harvesting assembly of claim 8, wherein the first position has a first discharge angle and the second position has a second discharge angle, the first discharge angle being greater and more biased towards an underlying surface than the second discharge angle.

11. The sugarcane harvesting assembly of claim 10, further wherein the second discharge angle generates a lower fan resistance than the first discharge angle.

* * * * *